(12) United States Patent
Marantz et al.

(10) Patent No.: US 9,639,614 B2
(45) Date of Patent: May 2, 2017

(54) MAXIMIZING CONTENT ITEM INFORMATION ON A SEARCH ENGINE RESULTS PAGE

(75) Inventors: Daniel Marantz, Bellevue, WA (US); Keith Alan Regier, Kirkland, WA (US); Tejas Girish Nadkarni, Bellevue, WA (US); Diana Hsu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 444 days.

(21) Appl. No.: 13/252,658

(22) Filed: Oct. 4, 2011

(65) Prior Publication Data

US 2013/0086031 A1    Apr. 4, 2013

(51) Int. Cl.
  *G06F 7/00*     (2006.01)
  *G06F 17/30*    (2006.01)

(52) U.S. Cl.
  CPC .. *G06F 17/30867* (2013.01); *G06F 17/30994* (2013.01)

(58) Field of Classification Search
  CPC ................................................. G06F 17/30905
  USPC .......................................................... 707/706
  See application file for complete search history.

(56) References Cited

U.S. PATENT DOCUMENTS

| | | | |
|---|---|---|---|
| 7,593,928 B2 | 9/2009 | Canon et al. | |
| 2005/0193010 A1* | 9/2005 | DeShan et al. | ............ 707/104.1 |
| 2006/0085741 A1* | 4/2006 | Weiner | .............. G06F 17/30893 715/246 |
| 2007/0067305 A1* | 3/2007 | Ives | .................. G06F 17/30864 |
| 2007/0079236 A1* | 4/2007 | Schrier et al. | ................ 715/517 |
| 2007/0204220 A1* | 8/2007 | Petrov Nickolov | .......... G06F 17/30905 715/234 |
| 2007/0288498 A1* | 12/2007 | Dietz et al. | .................... 707/102 |
| 2007/0299830 A1* | 12/2007 | Muenchhoff et al. | ............ 707/3 |
| 2009/0171920 A1* | 7/2009 | Wade et al. | ........................ 707/4 |
| 2009/0249193 A1 | 10/2009 | Hanechak | |
| 2009/0292986 A1 | 11/2009 | Anderson | |
| 2010/0114874 A1* | 5/2010 | Hansson et al. | .............. 707/722 |

(Continued)

OTHER PUBLICATIONS

Schrier, et al., "Adaptive Layout for Dynamically Aggregated Documents", In Proceedings of the 13th International Conference on Intelligent User Interfaces, Jan. 13-16, 2008, 10 pages.

(Continued)

*Primary Examiner* — Tony Mahmoudi
*Assistant Examiner* — Michael Le
(74) *Attorney, Agent, or Firm* — Shook, Hardy & Bacon L.L.P.

(57) ABSTRACT

Methods, computer systems, and computer-readable storage media for maximizing information associated with content items on a search engine results page are provided. A total number of pixels available on the search engine results page is determined, and content items are received in response to a search query. Templates are selected from a set of pre-generated templates, and the content items are initially assigned to the templates such that a number of content items is maximized on the search engine results page. Next, and starting with the highest-ranked content item, an optimal size is determined for each of the templates such that the content-item-per-pixel is maximized within each template. After resizing the templates to the optimal size, the content items are presented on the search engine results page.

20 Claims, 6 Drawing Sheets

(56) References Cited

U.S. PATENT DOCUMENTS

| | | |
|---|---|---|
| 2010/0115396 A1 | 5/2010 | Byron et al. |
| 2011/0010661 A1 | 1/2011 | Wade et al. |
| 2012/0209698 A1* | 8/2012 | Venkatakrishnan ............... G06Q 30/0277 705/14.49 |
| 2013/0019181 A1* | 1/2013 | Kitamorn ............... G06Q 50/01 715/736 |

OTHER PUBLICATIONS

"Choosing a Web Design Layout", Retrieved on: Jun. 22, 2011, Available at: http://www.atomicwebsitetemplates.com/blog/web-design/choosing-a-web-design-layout/, 3 pages.

"Using Display Templates", Retrieved on: Jun. 22, 2011, Available at: http://download.oracle.com/docs/cd/E13155_01/wlp/docs103/cm/displaytemplatesCM.html, 10 pages.

* cited by examiner

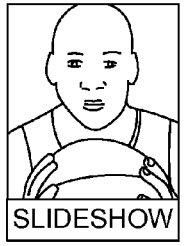

500

TOM SMOOZE

514

OFFICIAL TOM SMOOZE WEBSITE: TOM SMOOZE
WWW.TOMSMOOZE.COM – OFFICIAL SITE
OFFICIAL TOM SMOOZE SITE: WATCH MOVIE TRAILERS, VIDEOS, AND A CAREER RETROSPECTIVE OF TOM SMOOZE FILMS. READ...

SLIDESHOW

510

IMAGES

512

MOVIES

BIG MOVIE 1
BIG MOVIE 2
BIG MOVIE 3
BIG MOVIE 4

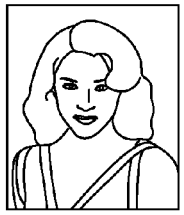

JANE DOE – DICTIONARY, THE FREE...

612

EN.DICTIONARY.ORG/DICTIONARY/JANE
JANE DOE (BORN AUGUST 4, 1961) IS THE 44$^{TH}$ AND CURRENT PRESIDENT OF THE UNITED STATES. SHE...

610

IMAGES

RECENT INFORMATION @JANEDOE – THIS WEST WING WEEK: FOCUSING ON JOBS AND THE ECONOMY AT THE STATE OF THE UNION. - 9 HOURS AGO

*FIG. 6.*

MAXIMIZING CONTENT ITEM INFORMATION ON A SEARCH ENGINE RESULTS PAGE

BACKGROUND

A search query typically returns text-based algorithmic search results along with visually-rich content items such as maps, images, tables, and the like. The text-based algorithmic search results along with the content items are presented on a search engine results page. However, the screen real estate available to display the search engine results page may vary due to the Web browser used and/or the size of the display screen on the display device. A traditional approach to dealing with the varying amounts of available screen real estate is to uniformly decrease the size of templates used to present the content items. The templates can then be used for display devices with a small amount of available screen real estate. While this may be somewhat successful for display devices with a small amount of screen real estate, screen real estate is not being effectively utilized on display devices with larger screens. As well, the use of small templates often results in truncation of the content items.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, maximizing information associated with content items on a search engine results page. In brief and at a high level, a set of content items is received in response to a search query; the set of content items is ranked by relevance. The set of content items is initially assigned to flexibly-sized templates such that the number of content items on the search engine results page is maximized. Next, and starting with the highest-ranked content item, pixel-based measurement is used to determine an optimal size for the flexibly-sized template so that content-item-per-pixel is maximized on the search engine results page. The flexibly-sized templates are dynamically resized to the optimal size, and at least a portion of the set of content items is presented on the search engine results page. The content items are presented based on their ranking.

BRIEF DESCRIPTION OF THE DRAWINGS

The present invention is described in detail below with reference to the attached drawing figures, wherein:

FIG. 5 is an exemplary user interface illustrating a presentation of content items in accordance with an embodiment of the present invention;

FIG. 6 is an exemplary user interface illustrating a presentation of content items in accordance with an embodiment of the present invention.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer-readable storage media for, among other things, maximizing information associated with content items on a search engine results page. In brief and at a high level, a set of content items is received in response to a search query; the set of content items is ranked by relevance. The set of content items is initially assigned to flexibly-sized templates such that the number of content items on the search engine results page is maximized. Next, and starting with the highest-ranked content item, pixel-based measurement is used to determine an optimal size for the flexibly-sized template so that content-item-per-pixel is maximized on the search engine results page. The flexibly-sized templates are dynamically resized to the optimal size, and at least a portion of the set of content items is presented on the search engine results page. The content items are presented based on their ranking. As used throughout this specification, the term "dynamically" means that the process occurs in near real-time and in an online setting.

Figure 1:
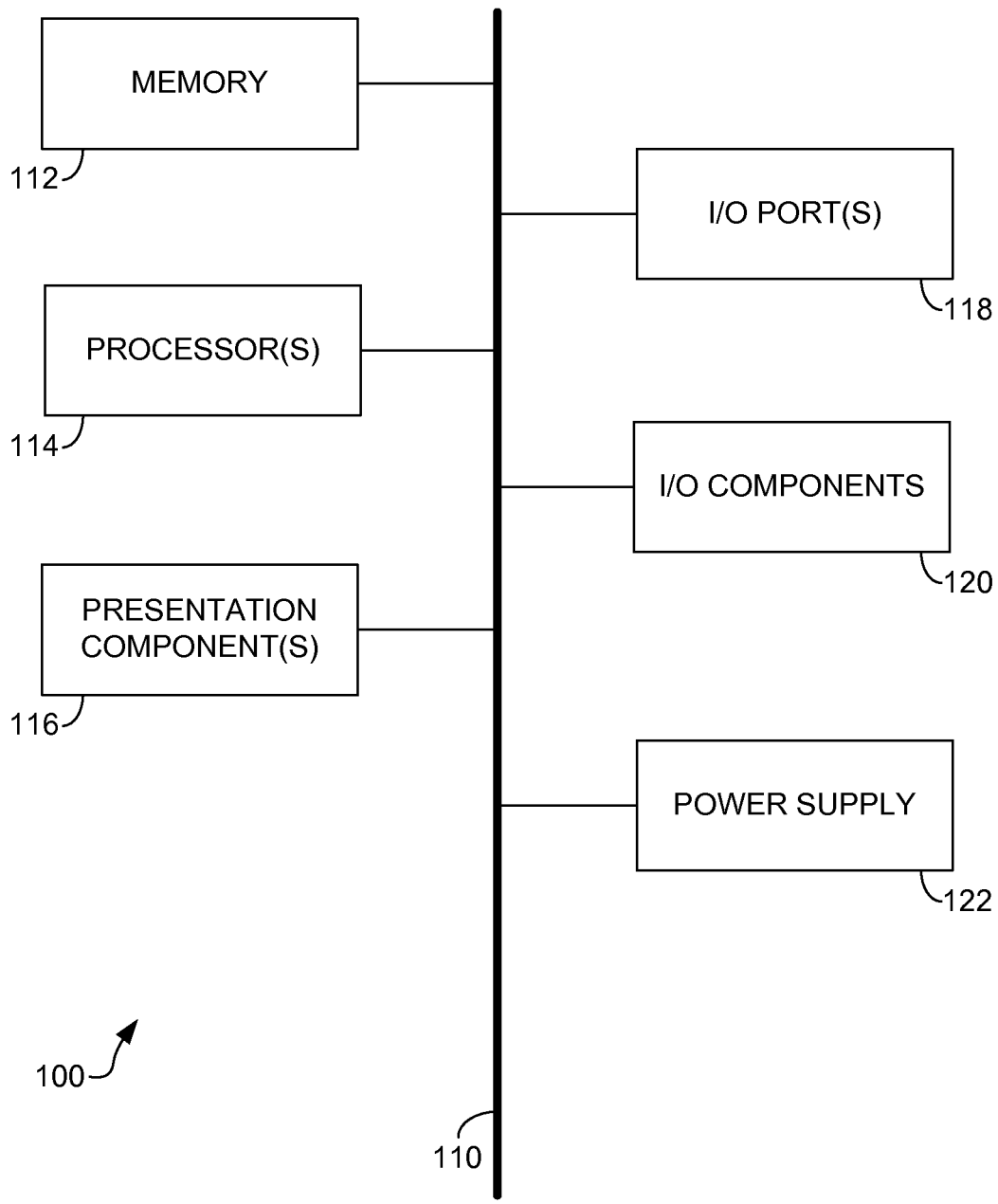
FIG. 1 is a block diagram of an exemplary computing environment suitable for use in implementing embodiments of the present invention.

An exemplary computing environment suitable for use in implementing embodiments of the present invention is described below in order to provide a general context for various aspects of the present invention. Referring to FIG. 1, such an exemplary computing environment is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a set of one or more processes distributed on one or more computers, one or more stand-alone storage devices, a set of one or more other computing or storage devices, a combination of one or more of the above, and the like.

Figure 2:
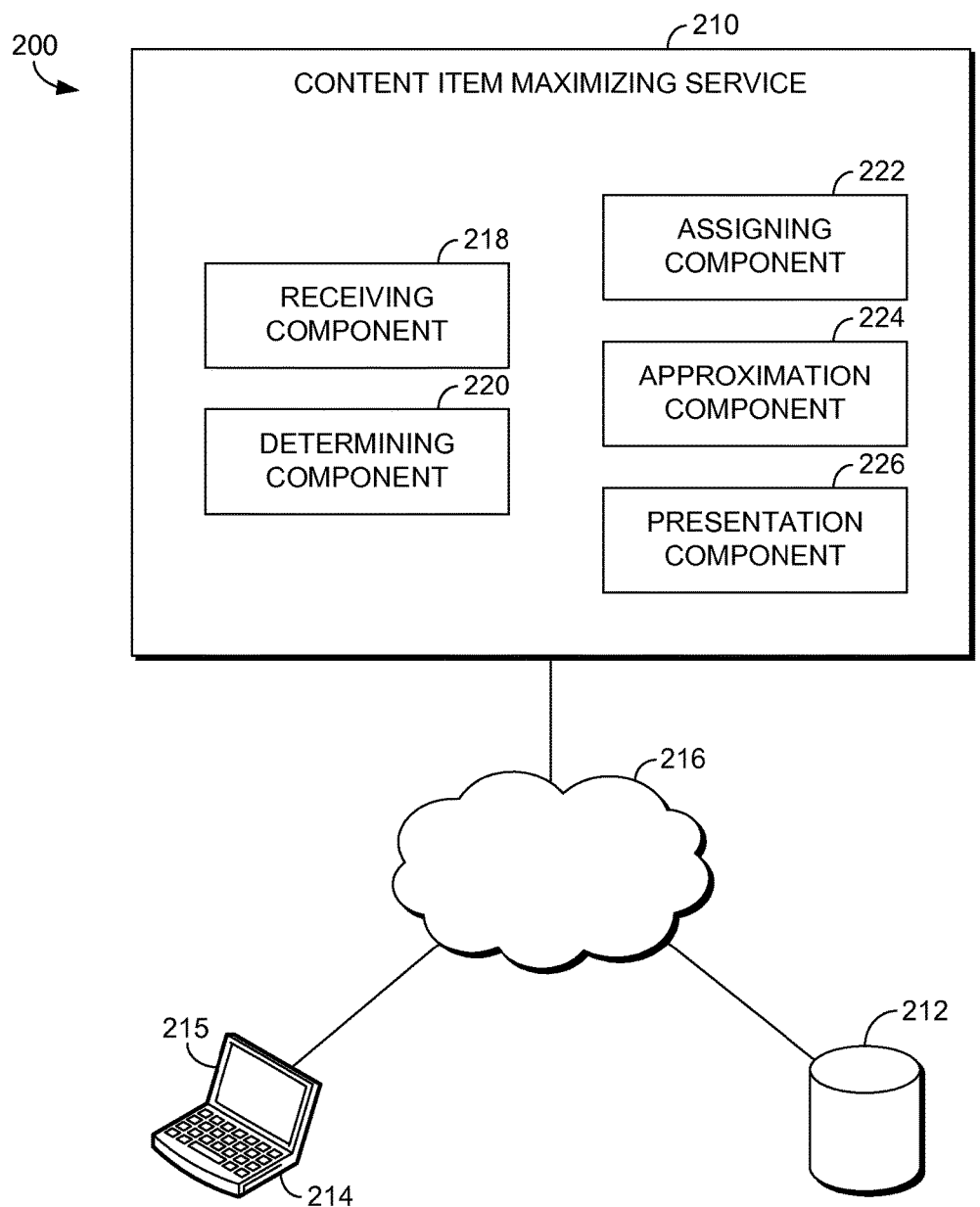
FIG. 2 is a block diagram of an exemplary system for maximizing content item information on a search engine results page suitable for use in implementing embodiments of the present invention.

With this as a background and turning to FIG. 2, an exemplary system 200 is depicted for use in maximizing content item information on a search engine results page. The system 200 is merely an example of one suitable system environment and is not intended to suggest any limitation as to the scope of use or functionality of embodiments of the present invention. Neither should the system 200 be interpreted as having any dependency or requirement related to any single module/component or combination of modules/components illustrated therein.

The system 200 includes a content item maximizing service 210, a data store 212, and an end-user computing device 214 all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

In some embodiments, one or more of the illustrated components/modules may be implemented as stand-alone applications. In other embodiments, one or more of the illustrated components/modules may be integrated directly into, for example, the operating system of the end-user computing device 214 or the content item maximizing service 210. The components/modules illustrated in FIG. 2 are exemplary in nature and in number and should not be construed as limiting. Any number of components/modules may be employed to achieve the desired functionality within the scope of embodiments hereof. Further, components/modules may be located on any number of servers. By way of example only, the content item maximizing service 210 might reside on a server, a cluster of servers, or a computing device remote from one or more of the remaining components. Further, the content item maximizing service 210 may be associated with a search engine provider.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The data store 212 is configured to store information for use by, for example, the content item maximizing service 210. The information stored in association with the data store 212 is configured to be searchable for one or more of the items of information stored in association therewith. The information stored in association with the data store 212 may comprise general information used by the content item maximizing service 210. For example, the data store 212 may store information concerning search results corresponding to any number of search queries. The search results may comprise text-based algorithmic search results as well as visually-rich content items. The content items may comprise images, tables, maps, lists, videos, and the like. The data store 212 may also store flexibly-sized, pre-generated templates. The pre-generated templates are flexibly-sized in that each template may come in a number of different sizes. The templates are used by, for example, the content item maximizing service 210 to present content items on a search engine results page.

The content and volume of such information in the data store 212 are not intended to limit the scope of embodiments of the present invention in any way. Further, though illustrated as a single, independent component, the data store 212 may, in fact, be a plurality of storage devices, for instance, a database cluster, portions of which may reside on the content item maximizing service 210, the end-user computing device 214, and/or any combination thereof.

The end-user computing device 214 shown in FIG. 2 may be any type of computing device, such as, for example, the computing device 100 described above with reference to FIG. 1. By way of example only and not limitation, the end-user computing device 214 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

As shown, the end-user computing device 214 includes a display screen 215. The display screen 215 is configured to display information, including search results, to the user of the end-user computing device 214. The display screen 214 may be variably-sized depending on a type of the end-user computing device 214 (for example, a handheld device may have a smaller display screen than a desktop computer). Thus, the display screen 214 may have a variable amount of screen real estate available for displaying search results corresponding to a search query. As well, different Web browsers may utilize varying amounts of available screen real estate on the display screen 215 in order to present search results.

The system 200 is merely exemplary. While the content item maximizing service 210 is illustrated as a single unit, it will be appreciated that the content item maximizing service 210 is scalable. For example, the content item maximizing service 210 may in actuality include a plurality of computing devices in communication with one another. Moreover, the data store 212, or portions thereof, may be included within, for instance, the content item maximizing service 210 as a computer-storage medium. The single unit depictions are meant for clarity, not to limit the scope of embodiments in any form.

As shown in FIG. 2, the content item maximizing service 210 comprises a receiving component 218, a determining component 220, an assigning component 222, an approximation component 224, and a presentation component 226. In some embodiments, one or more of the components 218, 220, 222, 224, and 226 may be implemented as stand-alone applications. In other embodiments, one or more of the components 218, 220, 222, 224, and 226 may be integrated directly into the operating system of a computing device such as the computing device 100 of FIG. 1. It will be understood that the components 218, 220, 222, 224, and 226 illustrated in FIG. 2 are exemplary in nature and in number and should not be construed as limiting. Any number of components may be employed to achieve the desired functionality within the scope of embodiments hereof.

The receiving component 218 of FIG. 2 is configured to receive a set of content items returned in response to a search query inputted by a user (for example, a user of the end-user computing device 214). The set of content items may be received from, for example, the data store 212. Content items include images, videos, maps, lists, tables, and the like. Each of the content items has an associated content type. A content type is a preferred layout of the content item—a layout designed to convey a high amount of information about the content item. For example, content types may include a single image, a row of images, a block of images, a single image of a map, a title with a list, a list, and the like.

The set of content items received by the receiving component 218 may be ranked in order of relevance. Thus, a first content item may be deemed more relevant than a second content item and, therefore, be ranked higher than the second content item. The receiving component 218 is also configured to receive a set of text-based algorithmic search results returned in response to the same search query; the algorithmic search results may also be received from the data store 212.

The determining component 220 is configured to dynamically determine a total number of pixels available on the search engine results page. As mentioned earlier, the total number of pixels available on the search engine results page may vary depending on an amount of screen real estate available on, for example, the display screen 215 of the end-user computing device 214. The total number of available pixels may also depend on the particular Web browser used to display the search engine results page. For example, some Web browsers utilize a smaller amount of available screen real estate than other Web browsers to display a search engine results page. In one aspect of the invention, the determining component 220 determines a total number of pixels available across a horizontal width of the search engine results page.

The determining component 220 is also configured to determine one or more features associated with each of the content items received by the receiving component 218. The features may include a content type associated with the content item, an amount of information associated with the content item, a relevance or ranking of the content item, and the like.

The assigning component 222 of FIG. 2 is configured to select one or more flexibly-sized templates from a set of pre-generated flexibly-sized templates stored in, for example, the data store 212. The templates are used to present content items on a search engine results page. In one aspect, the pre-generated templates may be generic in nature such that they can be used for a variety of different content items. In another aspect, the templates may be pre-generated such that they are customized to specific content items. By way of illustrative example, a pre-generated template may be a weather answer template which is used for a specific content item.

The assigning component 222 may select the one or more flexibly-sized templates based on a size of the template. As well, the assigning component 222 may select the one or more flexibly-sized templates based on a layout framework of the template. The layout framework comprises a structure or plan that specifies how a content item will be organized in the template. The assigning component 222 may select a template such that the layout framework of the template corresponds to a content type of a content item.

As mentioned, when selecting the templates, the assigning component 222 may select from a number of different sizes for each pre-generated template. For example, the assigning component 222 may select from a small, medium, large or extra-large size pre-generated template in order to accommodate content items of varying sizes. Each size of the template has a different pixel dimension (a pixel is generally thought of as the smallest single component of a digital image). For example, a template may have a width of a certain number of pixels and a height of a certain number of pixels.

Each of the pre-generated flexibly-sized templates has a predetermined minimum rendering threshold. The minimum rendering threshold is a threshold specifying that a content item have a minimum amount of information associated with it before it is considered a good answer to a search query. The information associated with a content item (content item information) may comprise textual elements, and/or visual elements associated with the content item. If the content item meets the minimum rendering threshold, then the content item may be presented on the search engine results page. By way of illustrative example, if the content item is movies associated with a certain actor, the minimum rendering threshold may require that a certain number of movies be associated with the actor before that content item is rendered. Visually, a title of "Movies" followed by a listing of one movie would not have as much visual impact or provide as much information to a viewer of the search results as a title of "Movies" followed by, for example, five movie listings. In one aspect of the invention, templates with different layout frameworks corresponding to different content types may have different predetermined minimum rendering thresholds. Further, each size of a template may have a different predetermined minimum rendering threshold.

The assigning component 222 is also configured to assign each of the received content items to one of the selected flexibly-sized templates based on a content type of the content item and a layout framework of the template. Starting with the highest ranked content item, the assigning component 222 of FIG. 2 is configured to assign each of the received content items to a template based on a content type of the content item. For example, if the content item is a number of images, and the content type is a block of images, the assigning component 222 will assign the content item to a selected template that has a layout framework corresponding to a block of images.

The content items are initially assigned to the selected templates such that a number of content items on the search engine results page is maximized. To achieve this, the assigning component 222 selects and assigns the content items to the smallest-size template available for that particular content type. The content items are sequentially assigned based on a ranking of the content item. For instance, in a horizontal row on the search engine results page, a higher-ranked content item is assigned to a template that is to a left-hand side of a template with a lower-ranked content item. After assigning the content items to the templates, a variable amount of pixel space may still be available on the search engine results page; this space is known as white space. The amount of available white space may be determined by, for example, the determining component 220.

When initially assigning the content items to the templates, the assigning component 222, using pixel-based measurements, may determine that the pixel width or height of a content item exceeds the pixel dimensions of the assigned template. In this instance, the assigning component 222 truncates the content item so that is fits within the template.

The approximation component 224 is configured to use pixel-based measurements and the one or more features of the content items to dynamically determine an optimal size for each of the templates such that: 1) content-item-per-pixel is maximized within each of the templates; 2) truncation of content items is substantially avoided; and 3) a maximum amount of the total number of available pixels on the search engine results page is utilized. The determination of an optimal size for each of the templates is accomplished after the content items have been assigned to the templates by the assigning component 222.

The approximation component 224 maximizes the content-item-per-pixel within each of the templates by starting with the highest-ranked content item and measuring the width and/or height of the content item within the template using pixel-based measurement. The approximation component 224 also utilizes the amount of information associated with the content item as determined by the determining component 220 to ascertain if a larger-sized template would be better suited to display the content item. For example, a content item may have been truncated because of the small size of the template to which it had been assigned. The approximation component 224 determines that the width and/or height of the content item is approximately equal to the width and/or height of the template. Further, the approximation component 224, via the determining component 220, recognizes that the content item has additional information that needs to be displayed. Additionally, the approximation component 224, via the determining component 220, knows the available amount of white space on the search engine results page. Based on this knowledge, the approximation component 224 dynamically determines that a medium-sized template is the optimal size for displaying the content item. The medium-sized template enables the additional information to be displayed, avoids truncation, and makes effective use of the available amount of white space.

In another illustrative example, a content item comprising a map may have been assigned to a small-sized template. The width and/or height of the map is approximately equal to the width and/or height of the template. However, the content item has no more information that needs to be displayed. Based on this knowledge, the approximation component 224 dynamically determines that the small-sized template is the optimal size for displaying the map. The approximation component 224 carries out these determinations sequentially starting with the highest-ranked content item and proceeding to the lowest-ranked content item.

The approximation component 224 is also configured to determine whether the amount of information associated with a content item meets the predetermined minimum rendering threshold of a template. As explained above, each pre-generated template has a predetermined minimum rendering threshold which is the minimum amount of information that a content item should have in order to be rendered for display on a search engine results page. Again starting with the highest-ranked content item, the approximation component 224 determines whether the content item meets the predetermined minimum rendering threshold for the template. If the content item fails to meet the minimum rendering threshold, the content item is marked as invalid and discarded. The available space remaining after the content item has been discarded is filled with the next highest-ranked content item and the process is repeated.

The presentation component 226 is configured resize the templates to the optimal size as determined by the approximation component 224 and to present the content items on the search engine results page. In one aspect, the presentation component 226 selects the optimal-sized template from the set of pre-generated flexibly-sized templates stored in the data store 212. The presentation component 226 presents the content items based on the ranking of the content items— highest ranked to lowest ranked. In one aspect of the invention, the presentation component 226 is configured to present text-based algorithmic search results simultaneously with the content items. The text-based algorithmic search results are in response to the initial search query inputted by the user. The text-based algorithmic search results may be displayed in a different area of the search engine results page, or highlighted in some manner to distinguish them from the content items.

Not all of the content items that were received by the receiving component 218 may be presented by the presentation component 226. For example, it may have been determined that a content item fails to meet the predetermined minimum rendering threshold of a template. As such, the content item is discarded and a lower-ranked content item is moved into its place. Additionally, there may not be enough available space on the search engine results page to present all of the lower-ranked content items.

Figure 3:
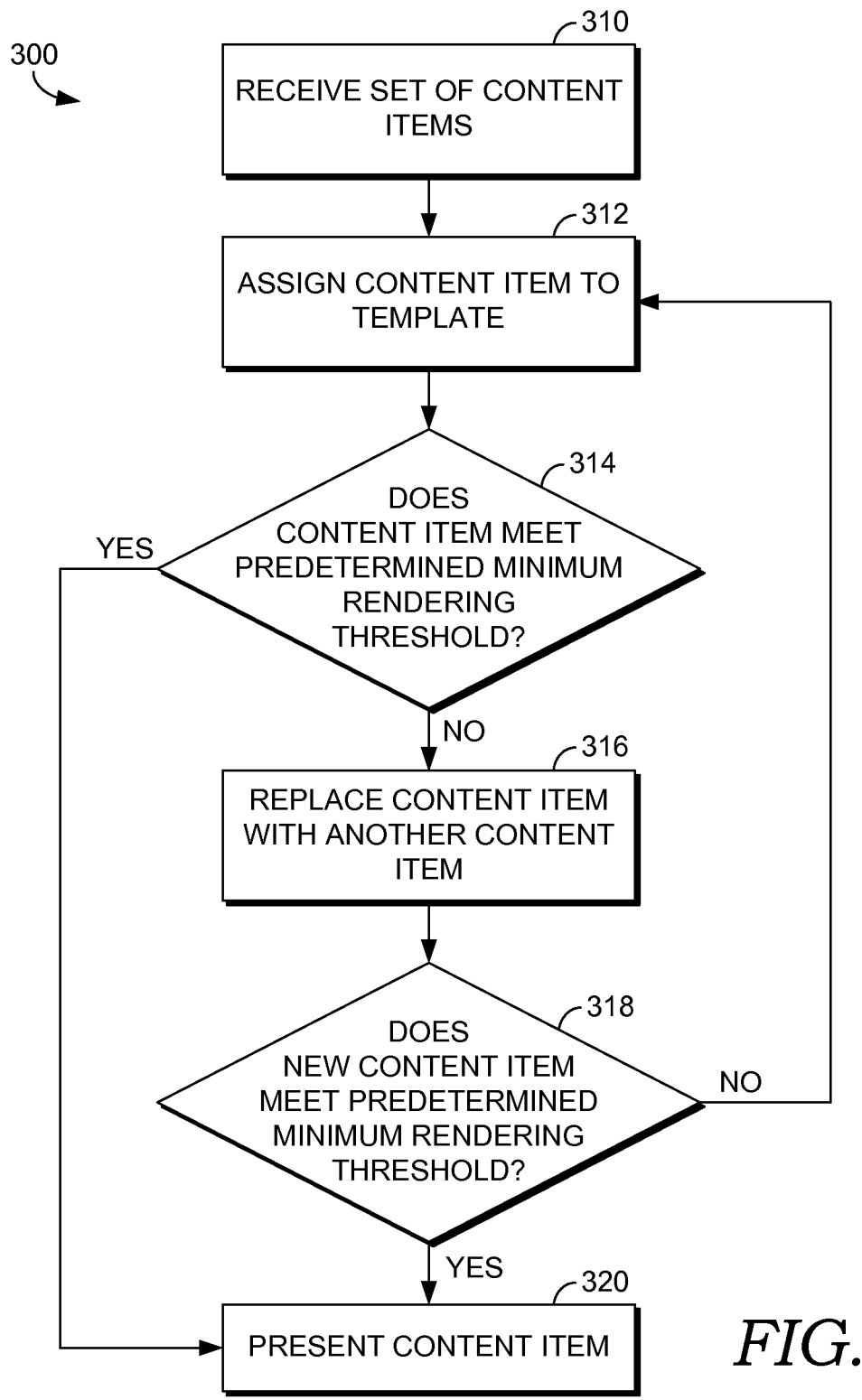
FIG. 3 is a flow diagram that illustrates a method of back-filling templates with lower-ranked content items in accordance with an embodiment of the present invention.

Turning now to FIG. 3, a flow diagram is depicted illustrating a method 300 of back-filling templates with lower-ranked content items. At step 310, a set of ranked content items is received in response to a search query; the set of content items includes at least a first content item and a second content item. The set of content items is ranked based on a relevance of each of the content items. For example, the first content item may be ranked higher than the second content item. The relevance may be determined by any number of ranking algorithms known in the art. The set of content items may be received by a receiving component such as, for example, the receiving component 218 of FIG. 2.

Continuing, at step 312, the first content item of the set of content items is assigned to a first template that has been selected from a set of pre-generated templates. The first content item is assigned to the first template based on a content type of the first content item and a layout framework of the first template. The first content item may be assigned to the first template by an assigning component such as the assigning component 222 of FIG. 2.

The first template has a predetermined minimum rendering threshold. The threshold may vary depending on the layout framework of the first template. As well, the threshold may vary depending on the size of the first template. As mentioned above, the minimum rendering threshold is the minimum amount of content item information needed in order to render the content item for display on a search engine results page.

At step 314, a determination is made as to whether the first content item meets the predetermined minimum rendering threshold of the first template. This determination may be made by an approximation component such as the approximation component 224 of FIG. 2. If, at step 314, it is determined that the first content item meets the predetermined minimum rendering threshold, then the first content item is rendered for display and presented to the user at step 320. If, however, it is determined that the first content item fails to meet the predetermined minimum rendering threshold, then, at step 316, the first content item is replaced with the second content item; the second content item is ranked lower than the first content item.

At step 318, a determination is made as to whether the second content item meets the predetermined minimum rendering threshold associated with the first template. If it is determined that the second content item meets the predetermined minimum rendering threshold, then, at step 320, the second content item is presented for display on the search engine results page. If, however, it is determined at step 318 that the second content item fails to meet the predetermined minimum rendering threshold, then the method 300 reverts back to step 312, and a new content item (for example, a third content item that is ranked lower than the second content item) is assigned to the first template and the method 300 proceeds as depicted.

Figure 4:
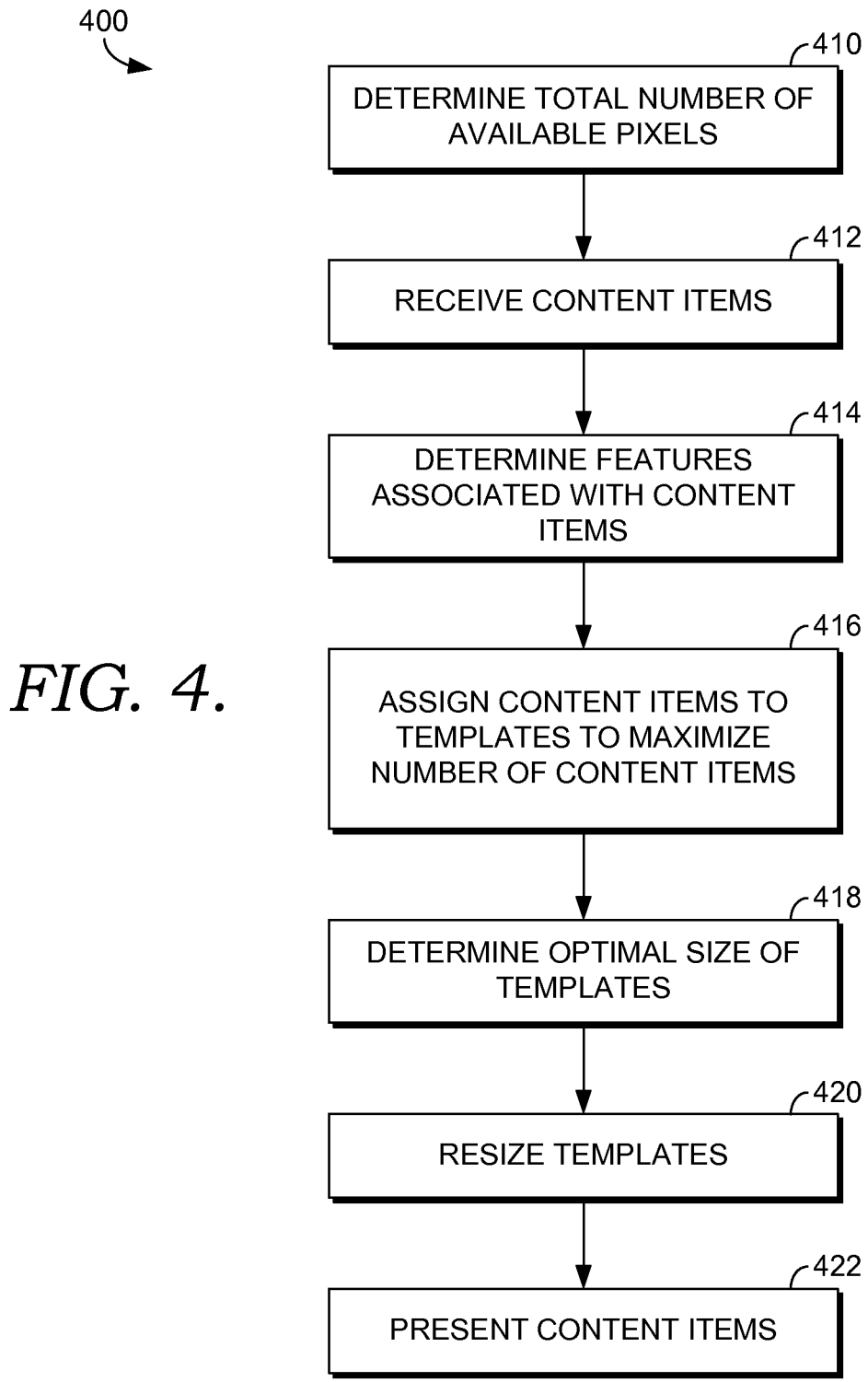
FIG. 4 is a flow diagram that illustrates a method of maximizing content item information on a search engine results page in accordance with an embodiment of the present invention.

Turning now to FIG. 4, a flow diagram is depicted illustrating a method 400 of maximizing content item information on a search engine results page. At step 410, a total number of pixels available on the search engine results page is determined by, for example, a determining component such as the determining component 220 of FIG. 2. The total number of pixels may be a total number of pixels available across a horizontal width of the search engine results page. The total number of available pixels may vary depending on the size of a display screen and/or the Web browser displaying the search engine results page.

At step 412, a set of content items is received in response to a search query inputted by a user. The set of content items may comprise different types of content items such as maps, images, tables, and the like. The set of received content items is in a ranking order based on relevance. The ranking order is determined by, for example, a search engine provider. At step 414, one or more features are determined for each of the content items. The features may include a content type of the content item, an amount of information associated with the content item (content item information), a relevance and ranking of the content item, a horizontal and vertical pixel dimension of the content item, and the like.

At step 416, templates are selected from a set of pre-generated templates, and the content items are assigned to the templates such that a number of content items on the search engine results page is maximized. To achieve this, a content item is assigned to the smallest-sized template available for the content type of that content item. Because the content items are assigned to the smallest-sized available template, the content item may be truncated in order to fit into the template.

As mentioned, the content items are assigned based on the content type of a content item, in addition, they are also assigned based on a ranking of the content item. A higher-ranked content item is assigned to a template before a lower-ranked content item. In one aspect, the content items are assigned to templates such that the highest-ranked content item is located near the left-hand side of the search engine results page and the lowest-ranked content item is located near the right-hand side of the page in a horizontal row.

At step 418, an optimal size is dynamically determined for each of the templates by, for example, an approximation component such as the approximation component 224 of FIG. 2. The optimal size is determined with the goal of maximizing the content-item-per-pixel in each template. The determination of an optimal size is done sequentially starting with the highest-ranked content item. The determination involves measuring the width and/or height of the content item within the template using pixel-based measurements and identifying whether there is additional information associated with the content item that is not being displayed because, for example, the additional information had been truncated. The determination may also include identifying what other sizes of the template are available, the pixel dimensions of the available sizes, and how much pixel space is available on the search engine results page after the initial assignment of the content items at step 416 (i.e., the available white space).

Still further, the determination of an optimal size may also involve determining whether the content item in the template meets the predetermined minimum rendering threshold of the template as outlined above with respect to FIG. 3. If the content item fails to meet the predetermined minimum rendering threshold and is replaced with a suitable content item, the determinations outlined above are carried out for the new content item. In conclusion, the optimal size of a template is a size that maximizes the amount of content item information, avoids truncation of the content item, and makes use of any available white space on the search engine results page.

As mentioned, the determination of optimally-sized templates is carried out sequentially starting with the highest-ranked content item and continuing with each lower-ranked content item. The process continues until all available white space has been utilized on the search engine results page, or the method 400 has been carried out a predetermined number of times, and the available amount of white space remains constant.

At step 420, the templates are dynamically resized to the optimal size as determined in step 418. In one aspect, the optimal-sized template is selected from a data store such as, for example, the data store 212 of FIG. 2. At step 422, the content items are presented on the search engine results page. In one aspect, the content items are presented in a horizontal row on the search engine results page. In some cases, the number of content items presented on the search engine results page is less than the number of content items returned in response to the search query. For example, the determination of optimally-sized templates may have resulted in lower-ranked content items being excluded from the search engine results page because of lack of available space. The method 400 is designed for any number of different types of content items such as, for example, images, maps, tables, lists, and the like. The result is that multiple different types of content items may be presented at step 422—all in optimally-sized templates.

FIGS. 5 and 6 depict some exemplary user interfaces that embody aspects of the current invention. With respect to FIG. 5, an exemplary user interface 500 is shown. The user interface 500 includes a text-based algorithmic search result 514, and two content items—images 510 and a listing of movies 512 in optimally-sized templates. The images 510 and the listing of movies 512 comprise the set of content items returned in response to a search query of "Tom Smooze." The images 510 were initially assigned to a smaller-sized template that truncated the second and third images. Using the method 400 outlined above with respect to FIG. 4, a determination was made that a larger-sized template was available for the content type of the images 510 (the content type is a row of images), and a determination was made that there was additional information associated with the images 510 that was being truncated due to the small size of the template. Additionally, a determination was made that there were available pixels on the search engine results page to the right of the listing of movies 512. Based on these determinations, a larger-sized template was used for the images 510 so that all three images could be depicted.

FIG. 6 depicts an exemplary user interface (UI) 600 that includes a text-based algorithmic search result 612 along with a row of images 610 in an optimally-sized template. The images 610 are the only content item returned in response to a search query of "Jane Doe." Before optimization, the images 610 may have been assigned to a small-sized template that truncated a substantial number of the images and left a large amount of white space on the search engine results page. As can be seen from FIG. 6, after optimization, the row of images 610 takes up a substantial portion of the horizontal row on the search engine results page and provides greater visual impact than a smaller-sized template displaying one or two images.

Figure 7:
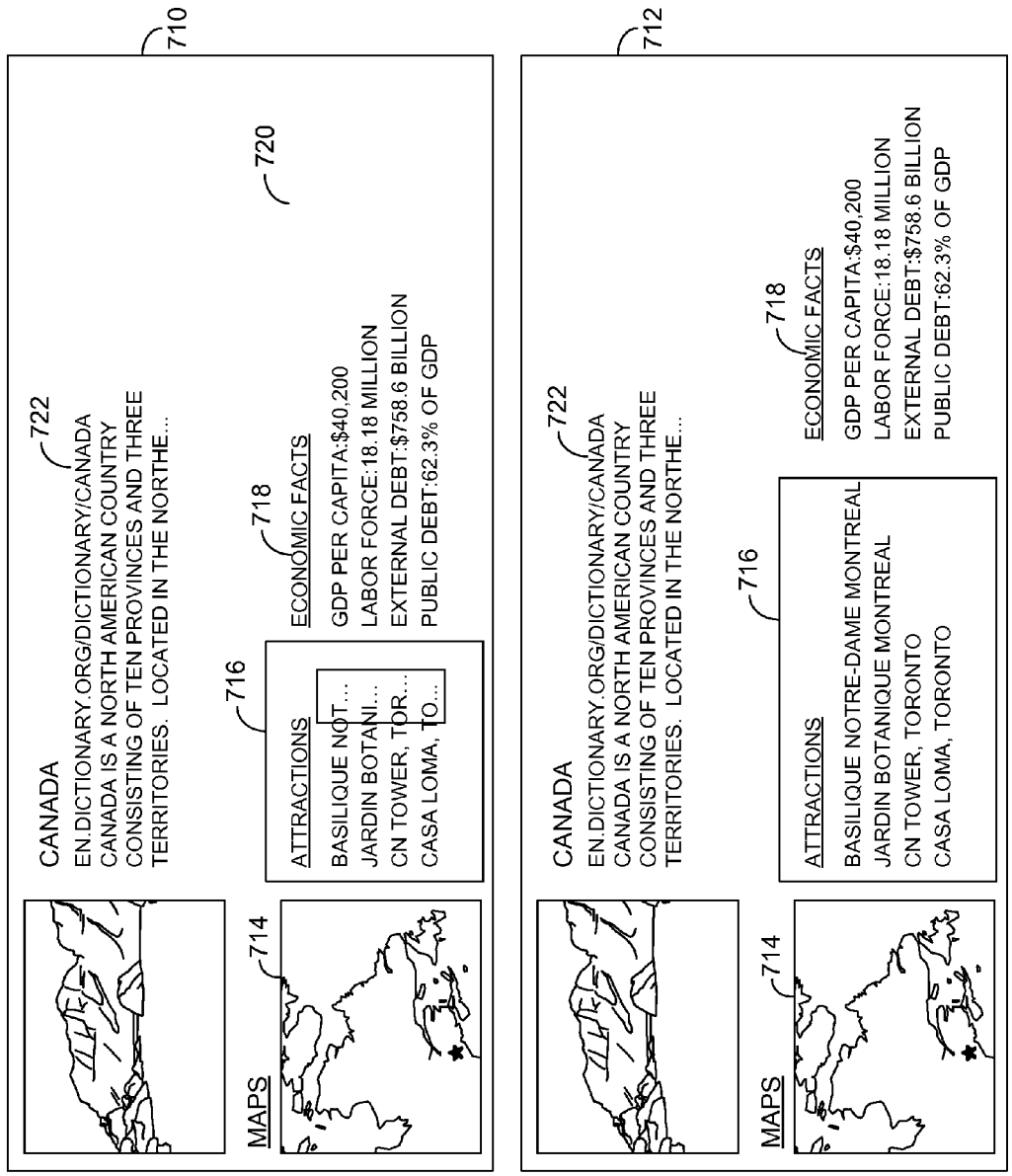
FIG. 7 depicts an exemplary user interface before content item information has been maximized and an exemplary user interface after content item information has been maximized in accordance with an embodiment of the present invention.

FIG. 7 depicts an exemplary UI 700 before and after optimization using pixel-based measurement. UI 710 is a depiction of the UI 700 before optimization and UI 712 is a depiction of the UI 700 after optimization. UI 700 comprises a text-based algorithmic search result 722, and a set of content items returned in response to the search query "Canada." The set of content items includes a map 714, attractions 716, and economic facts 718. UI 710 depicts an area of white space 720 to the right of economic facts 718. As outlined above, the set of content items is initially assigned to the smallest-sized template available for the content type corresponding to the content item. In order to fit some of the content items into the small-sized templates, information is truncated. Truncation is shown with respect to attractions 716 in UI 710.

UI 712 depicts attractions 716 in an optimally-sized template. The optimally-sized template avoids truncating information associated with the content item and helps to decrease the amount of white space 720. UI 712 also depicts how the content items are presented in order of relevance. For example, the map 714 is more relevant and ranked higher than attractions 716. In turn, attractions 716 is more relevant and ranked higher than economic facts 718.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A system for maximizing information associated with one or more content items on a search engine results page, the system comprising:
- a computing device having one or more processors and one or more computer-readable media; and
- a data store coupled with the computing device, wherein the computing device:
  - receives a plurality of different content items returned in response to a search query, wherein the plurality of different content items are ranked based on relevance;
  - dynamically determines a total number of pixels associated with a content item presentation space comprised of the entirety of horizontally-oriented pixels and vertically-oriented pixels located within the content item presentation space, based on:
    - a number of available pixels for a display screen of a display device; and
    - a number of available pixels for a search engine results page of a web browser associated with the search query;
  - determines a content type of a plurality of content types for each content item of the plurality of different content items, wherein each content type of the plurality of content types has one or more corresponding templates comprising at least a smallest-sized template and at least a larger-sized template;
  - based on the determined content type, assigns the each content item of the plurality of different content items to the smallest-sized template for the determined content type;
  - determines a total number of pixels associated with the each content item of the plurality of different content items, wherein the total number of pixels associated with the each content item is comprised of the entirety of horizontally-oriented pixels and vertically-oriented pixels located within the each content item;
  - determines an optimal template size for the each content item of the plurality of different content items, wherein determining an optimal template size comprises:
    - when the total number of pixels associated with the each content item of the plurality of different content items does not exceed a pixel-based measurement of the smallest-sized template, the smallest-sized template is used to render the content item; and
    - when the total number of pixels associated with the each content item of the plurality of different content items exceeds the pixel-based measurement of the smallest-sized template, assigning the content item to the larger-sized template and the larger-sized template is used to render the content item;
  - determines that at least one content item of the plurality of different content items fails to meet a predetermined minimum rendering threshold for the assigned template, wherein the predetermined minimum rendering threshold comprises a minimum amount of textual elements or visual elements associated with rendering the at least one content item;
  - replaces the at least one content item with a lower-ranked content item of the plurality of different content items and removes the at least one content item from the plurality of different content items to establish a set of remaining content items; and
  - fits the set of remaining content items into the content item presentation space such that:
    1) for each content item of the set of remaining content items, the total number of pixels associated with the each content item of the set of remaining content items is presented, and
    2) the total number of pixels associated with the content item presentation space is occupied by the set of remaining content items.

2. The system of claim 1, wherein the set of remaining content items comprises at least one of images, maps, tables, or lists.

3. The system of claim 1, wherein the set of remaining content items is fit into the content item presentation space in order of relevance.

4. The system of claim 1, wherein the content item presentation space comprises a horizontal row on the search engine results page, the total number of pixels of the horizontal row comprising the entirety of horizontally-oriented pixels and vertically-oriented pixels located within the horizontal row.

5. A computerized method carried out by a computing device having at least one processor for facilitating a method of maximizing information associated with one or more content items on a search engine results page, the method comprising:
- receiving a plurality of content items comprising a first content item and a second content item in response to a search query, the first content item being more relevant than the second content item, the first content item and the second content item each having a first content type specifying a preferred layout of the first content item and the second content item;
- determining a total number of pixels associated with the first content item and a total number of pixels associated with the second content item;
- dynamically determining a total number of pixels associated with a content item presentation space comprised of the entirety of horizontally-oriented pixels and vertically-oriented pixels located within the content item presentation space, based on:
  - a number of available pixels for a display screen of a display device; and
  - a number of available pixels for a search engine results page of a web browser associated with the search query;
- selecting, using the at least one processor, a first smallest-sized template having a layout framework corresponding to the first content type, the first smallest-sized template having a first pixel-based measurement;
- assigning the first content item and the second content item to the first smallest-sized template;
- determining that the total number of pixels associated with the first content item exceeds the first pixel-based measurement of the first smallest-sized template;
- assigning the first content item to a second larger-sized template, the second larger-sized template having a layout framework corresponding to the first content type and having a second pixel-based measurement, wherein the second pixel-based measurement is greater than the first pixel-based measurement;
- determining that the total number of pixels associated with the first content does not exceed the second pixel-based measurement of the second larger-sized template;

determining that the total number of pixels associated with the second content item does not exceed the first pixel-based measurement of the first smallest-sized template; and presenting the first content item in the second larger-sized template and the second content item in the first smallest-sized template with one or more additional content items of the plurality of content items on the search engine results page, such that a content-item-per-pixel is optimized for the total number of pixels associated with the content item presentation space, wherein the one or more additional content items of the plurality of content items have at least a second content type.

6. The method of claim 5, further comprising determining that at least one content item of the one or more additional content items fails to meet a predetermined minimum rendering threshold, the predetermined minimum rendering threshold requiring a minimum amount of content item information, and excluding the at least one content item of the one or more additional content items from the search engine results page.

7. The method of claim 6, wherein the predetermined minimum rendering threshold is based, at least in part on the layout of the first smallest-sized template.

8. One or more hardware devices having computer-executable instructions embodied thereon that, when executed by a computer having a processor and memory, facilitate a method of using pixel-based measurements to maximize information associated with a content item on a search engine results page, the method comprising:

dynamically determining a total number of pixels available on a content item presentation space associated with the search engine results page, based on:
  a number of available pixels for a display screen of a display device; and
  a number of available pixels for the search engine results page corresponding to a web browser used to render the search engine results page;

receiving a set of content items in response to a search query, wherein the set of content items is ranked in order of relevance;

determining one or more features including a content type of each content item of the set of content items, the content type specifying a preferred layout of the respective content item;

accessing a plurality of pre-generated template sets, each template set having a particular type of layout framework, each template set having one or more sizes, each size having a certain number of pixels;

for each content item in the set of content items, determining a template set having a layout framework corresponding to the content type of the each content item and from the determined template set, selecting a smallest-sized template for the each content item;

determining that at least one content item of the set of content items fails to meet a predetermined minimum rendering threshold for the selected template, wherein the predetermined minimum rendering threshold comprises a minimum amount of textual elements or visual elements associated with rendering the at least one content item;

replacing the at least one content item with a lower-ranked content item of the set of content items and removing the at least one content item from the set of content items;

determining that the total number of pixels associated with the selected templates is less than the total number of pixels available on the content item presentation space;

based on determining that the total number of pixels associated with the selected templates is less than the total number of pixels available on the content item presentation space and starting with a highest-ranked content item in the set of content items, determining whether there is additional information associated with the content item that will not be presented using the smallest-sized template, wherein:
  when a pixel-based measurement associated with the content item exceeds a pixel-based measurement associated with the smallest-sized template, selecting a larger-sized template from the determined template set associated with the content item, wherein a pixel-based measurement associated with the larger sized template is greater than the pixel-based measurement associated with the content item, and
  when the pixel-based measurement associated with the content item is less than the pixel-based measurement associated with the smallest-sized template, continuing to use the smallest-sized template; and presenting at least a portion of the set of content items in the content item presentation space on the search engine results page using the selected templates, the at least the portion of the content items presented based on the ranking of the set of content items.

9. The one or more hardware devices of claim 8, wherein each template set of the plurality of pre-generated template sets comprises at least one of a small size, a medium size, a large size, or an extra-large size, each size having a different pixel-based measurement.

10. The one or more hardware devices of claim 8, wherein the at least the portion of the content items presented in the content item presentation space associated with the search engine results page excludes the at least one content item that fails to meet the predetermined minimum rendering threshold.

11. The one or more hardware devices of claim 8, wherein the content type is one of: an image, a row of images, a block of images, a map, a title and list, and a list.

12. The one or more hardware devices of claim 8, wherein determining the total number of pixels available on the content item presentation space associated with the search engine results page comprises determining the total number of pixels available across a horizontal width of the content item presentation space.

13. The one or more hardware devices of claim 12, wherein the total number of pixels available on the content item presentation space associated with the search engine results page is dependent on a screen size of a device receiving the set of content items.

14. The one or more hardware devices of claim 8, wherein the one or more features further include:
  a quantity of information associated with the each content item,
  a relevance of the each content item, and
  a pixel-based measurement the each content item.

15. The one or more hardware devices of claim 8, wherein the highest-ranked content item is presented on a left-hand side of the content item presentation space associated with the search engine results page.

16. The one or more hardware devices of claim 15, wherein the determination of whether there is additional information associated with the content items that will not be presented using the smallest-sized templates done sequentially starting with the highest-ranked content item and proceeding in ranked order of relevance.

17. The one or more hardware devices of claim 8, wherein a set of text-based algorithmic search results is also received in response to the search query.

18. The one or more hardware devices of claim 17, wherein the at least the portion of the content items presented on the content item presentation space associated with the search engine results page is presented simultaneously with the set of text-based algorithmic search results.

19. The one or more hardware devices of claim 8, further comprising determining that the total number of pixels associated with the selected templates is less than the total number of pixels available on the content item presentation space and truncating a lowest-ranked content item of the at least a portion of the set of content items.

20. The one or more hardware devices of claim 8, wherein selecting the larger-sized template from the determined template set associated with the content item comprises adjusting at least one of a pixel width or a pixel height of the larger-sized template such that truncation of the content item is avoided.

* * * * *